United States Patent [19]
Estep

[11] Patent Number: 5,100,256
[45] Date of Patent: Mar. 31, 1992

[54] RETAINING PIN MODULE

[75] Inventor: John M. Estep, Granville Summit, Pa.

[73] Assignee: Ingersoll-Rand Company, Woodcliff Lake, N.J.

[21] Appl. No.: 545,544

[22] Filed: Jun. 29, 1990

[51] Int. Cl.⁵ .............................................. B25G 3/18
[52] U.S. Cl. ...................................... 403/328; 403/108
[58] Field of Search ............................... 403/328, 108

[56] References Cited

U.S. PATENT DOCUMENTS

| | | | |
|---|---|---|---|
| 2,851,295 | 9/1958 | Chaffee | 403/328 |
| 2,932,047 | 4/1960 | Johnston | 403/328 X |
| 3,214,187 | 10/1965 | Fuerst | 403/328 X |
| 4,026,605 | 5/1977 | Emmerich | 403/328 X |
| 4,323,319 | 4/1982 | Adams | 403/328 X |

Primary Examiner—Andrew V. Kundrat
Attorney, Agent, or Firm—Robert F. Palermo; Walter C. Vliet

[57] ABSTRACT

A modular retaining device provides ease of assembly and disassembly as well as versatility. Conversion from spring loaded plunger type retention to through hole pin type retention by pressing the retaining module in or out of a through hole cavity provides this versatility without the weakening effect of the intersecting bore hole required for known spring loaded plunger retention systems. A variety of configurations for the retaining element is provided.

2 Claims, 2 Drawing Sheets

RETAINING PIN MODULE

BACKGROUND OF THE INVENTION

This invention relates generally to power tools and more particularly to devices for retaining sockets and the like on the output drive shaft of such tools.

Because of the multiplicity of fastening operations and other tool applications, it is desirable to have interchangeable bits, sockets, or other tools to be driven by power tools or other speed drives. For example, in the case of sockets for driving fasteners, literally dozens of sockets of various sizes may be used with the same drive.

There are several different types of drive shafts, but one of the most common is the square drive which has become an industry standard for use on hand held power tools.

The requirements for such a drive shaft are that it allow easy installation and removal of sockets and other tool bits while providing positive retention of such tools during operation. Several retaining devices, having varying degrees of complexity, are currently available. One such device is the common spring loaded pin or ball which is captured in and protrudes laterally from the output shaft of the tool and nests in a groove, hole, or other detent provision inside the socket. This permits installation and removal of the socket by a straight pushing or pulling action to overcome the spring load.

Another retention provision is the so-called "through hole" type. In this case, the output shaft has a lateral hole drilled completely through its drive end. Sockets for us with the through hole type retainer have appropriately placed holes to align with that of the drive shaft. A socket is placed on the shaft, and a pin is inserted through the socket and the drive shaft holes. The pin is held in place by an elastic ring which nests in a circumferential groove on the outside of the socket over the retaining pin holes.

Use of sockets made for the one retention system on a tool having an output shaft with the other retention system is, at best, difficult and, at worst, impossible. This lack of interchangeability creates obvious economic disadvantages no the least of which is the requirement for maintaining duplicate sets of sockets and bits along with duplicate power tools.

The foregoing illustrates limitations known to exist in present retaining pin systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a retaining pin module for use in a rotary drive tool spindle which is drilled for a through hole retaining pin comprising a uniform cylindrical shell press fitted in the spindle; at least one retaining element movably mounted in the shell; resilient means for urging the retaining element to protrude from the shell; and the retaining element the shell.

The foregoing and other aspects will become apparent from the following detailed description of the invention when considered in conjunction with the accompanying drawing FIGURES.

BRIEF DESCRIPTION OF THE DRAWING FIGURES

DETAILED DESCRIPTION

Figure 1:
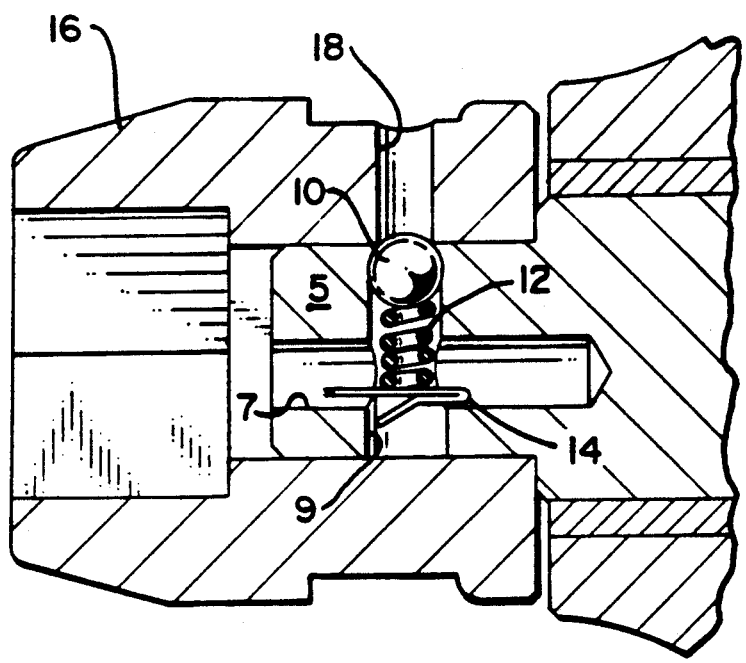
FIG. 1 is a schematic partially cross-sectional illustration of a typical spring loaded plunger type retainer.

In FIG. 1, a socket 16 is shown retained on a spindle 5 with a spring loaded plunger type retainer. Spindle end bore 7 and spindle cross bore 9 are drilled so that they intersect. Note that spindle cross bore 9 has a constriction at its one end which prevents retainer element 10, which may be a sphere or shouldered cylindrical shape, from passing through the constricted end of the spindle cross bore. The retainer element 10 is urged toward the constricted end of the spindle cross bore 9 by a spring 12 supported on a spring base 14 within the spindle cross bore 9. When installed on spindle 5, socket 16 is retained by the protrusion of retainer element 10 into socket retainer bore 18. Since retainer element 10 is urged outward by spring 12, it is easily depressed to permit installation or removal of socket 16 from spindle 5.

Figure 2:
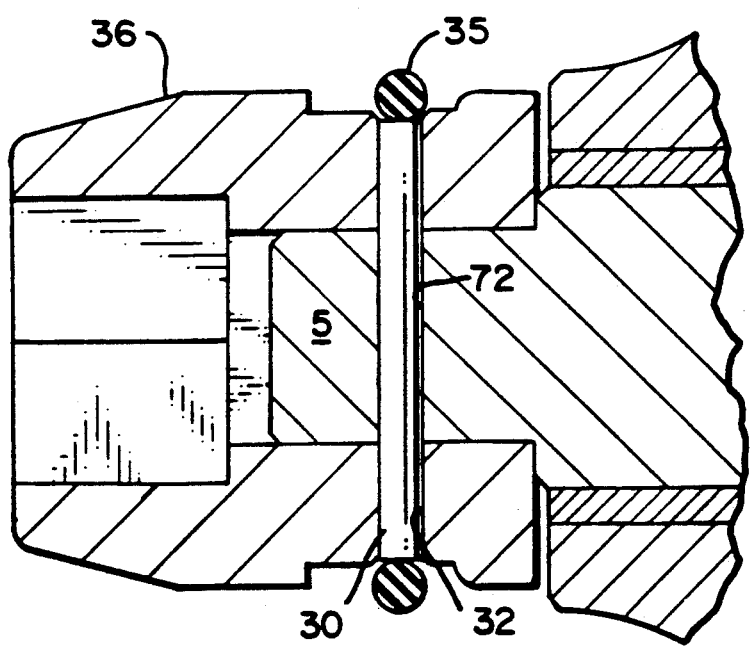
FIG. 2 is a schematic partially cross-sectional illustration of a typical through hole type retainer.

In the through hole type retainer illustrated in FIG. 2, there is a spindle bore 72 transversely placed in spindle 5. This bore is of uniform diameter throughout and is the same diameter as that of socket bore 32. Socket 36 is placed on spindle 5; pin 30 is inserted through socket bore 32 into spindle bore 72. Retaining pin 30 is captured in socket bore 32 and spindle bore 72 by the elastic pin retaining ring 35. Examination of FIGS. 1 and 2 clearly indicates that the two retention mechanisms are not interchangeable.

Figure 3:
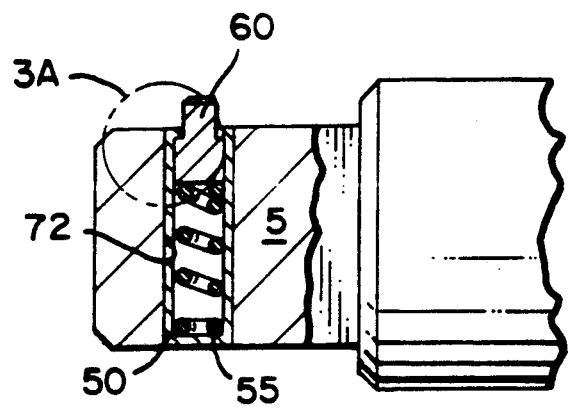
FIG. 3 is a schematic cross-sectional illustration of one embodiment of the present invention.
Figure 3A:
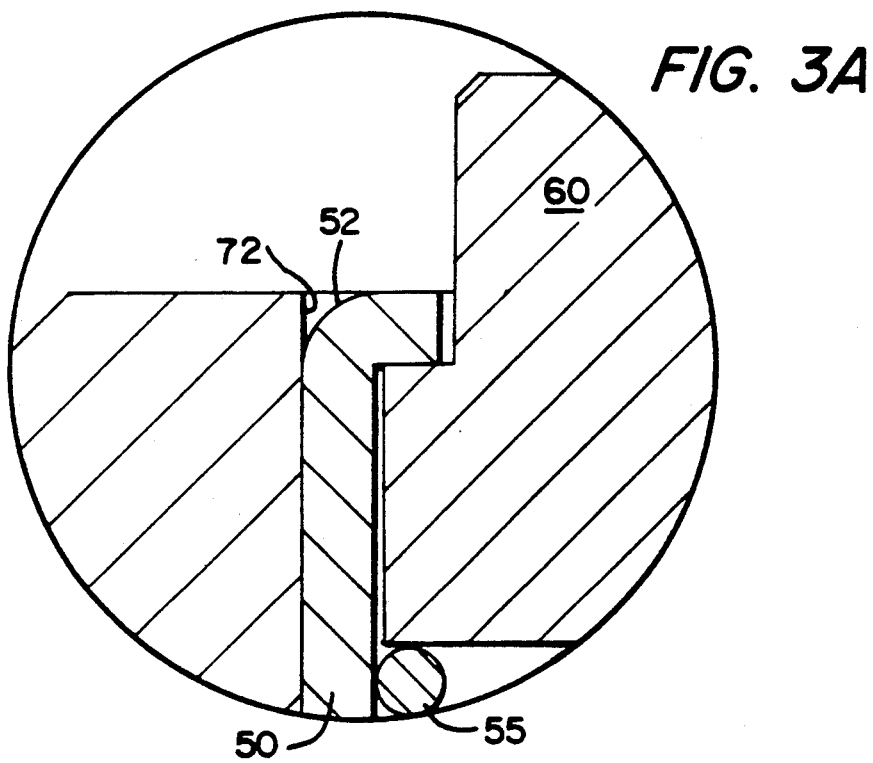
FIG. 3A is an enlarged schematic view of the circled area labeled 3A in FIG. 3.

FIG. 3 shows the spring loaded plunger embodiment of the present invention. Here the spindle or anvil 5 is shown with a through hole bore 72 which would permit its use with the socket retention system illustrated in FIG. 2. The shell 50, shown with one closed end, is pressed into through hole 72 and contains spring 55 and retaining element 60. The retainer element 60 is shown as a shouldered pin, but it could as well be a sphere, a domed pin, or other form. The circled area labeled 3A is enlarged and illustrated in FIG. 3A. This reveals detail of the method of capturing retaining element 60 within shell 50 to limit its protrusion from the open end of shell 50. A rolled edge 52 is shown as the preferred embodiment of the method of capture. Retainer element 60 could, however, be captured by a threaded cap, localized staking, or a groove and snap ring arrangement (not shown).

A comparison of FIGS. 1 and 2 shows that, all other things being equal, the known through hole retaining pin configuration has less of a weakening effect on the spindle than does the spring loaded plunger arrangement. This is because the through hole arrangement does not require a spindle axial bore with its attendant weakening effect.

The present invention, thus, provides the advantages of strength and versatility. Its modularity permits ready conversion from the spring loaded plunger configuration to the through hole pin configuration. This requires only that the retaining pin module be pressed in or out of the existing through hole, depending on the configuration desired.

What is claimed is:

1. In combination with a socket mounted on a rotary drive tool spindle which are drilled for a through hole retaining pin to be captured therein by an elastic ring, said socket having a circumferential groove for accommodating said elastic ring, an alternative retaining pin module comprising:

a uniform cylindrical shell press fitted in the spindle through hole;

at least one shouldered retaining element movably mounted in said shell;

resilient means within said shell for urging said retaining element to protrude from said shell into engagement with the socket through hole; and a circumferential lip formed on at least one end of the shell for capturing said retaining element within said shell.

2. The retaining pin module of claim 1 wherein the resilient means for urging the retaining element to protrude from said shell comprises a spring.

* * * * *